United States Patent
Martin

(10) Patent No.: US 9,162,304 B2
(45) Date of Patent: Oct. 20, 2015

(54) METHOD FOR THE INDUCTION BRAZING OF PARTS HAVING COMPLEX SHAPES, AND SINGLE OR MULTIPLE BRAZING STATION FOR IMPLEMENTING SAME

(75) Inventor: Amanda Martin, Boucau (FR)

(73) Assignee: TURBOMECA, Bordes (FR)

( * ) Notice: Subject to any disclaimer, the term of this patent is extended or adjusted under 35 U.S.C. 154(b) by 281 days.

(21) Appl. No.: 13/810,592

(22) PCT Filed: Jul. 21, 2011

(86) PCT No.: PCT/FR2011/051768
§ 371 (c)(1),
(2), (4) Date: Jan. 16, 2013

(87) PCT Pub. No.: WO2012/022879
PCT Pub. Date: Feb. 23, 2012

(65) Prior Publication Data
US 2013/0119048 A1    May 16, 2013

(30) Foreign Application Priority Data
Jul. 29, 2010    (FR) ...................................... 10 56270

(51) Int. Cl.
B23K 13/01    (2006.01)
H05B 6/06    (2006.01)
(Continued)

(52) U.S. Cl.
CPC ...................................... B23K 1/002 (2013.01)

(58) Field of Classification Search
CPC ............ B23K 1/002; H05B 6/02; H05B 6/06; H05B 6/10; H05B 6/14
USPC ......... 219/615, 616, 617, 667, 635, 483, 485, 219/486, 497, 506, 663, 665; 228/262.31, 228/262.4, 262.41, 262.42, 262.43, 262.44, 228/262.45, 262.5, 262.51, 262.6, 262.61, 228/262.7, 262.71, 262.72, 262.8, 262.9; 403/265, 266, 267, 268, 269, 270, 271, 403/272; 138/142, 143, 144; 299/113; 148/508, 698, 128, 549, 700, 498, 511
See application file for complete search history.

(56) References Cited

U.S. PATENT DOCUMENTS 3,220,180 A * 11/1965 Heckert ........................... 60/267
3,268,703 A *  8/1966 Schoppman et al. ......... 219/615
(Continued)

OTHER PUBLICATIONS

International Search Report Issued Dec. 8, 2011 in PCT/FR11/051768 Filed Jul. 21, 2011.

Primary Examiner — Dana Ross
Assistant Examiner — Gyounghyun Bae
(74) Attorney, Agent, or Firm — Oblon, McClelland, Maier & Neustadt, L.L.P.

(57) ABSTRACT

A method for brazing parts having complex profiles, while enabling reproducible implementation conditions to be defined. The method adjusts a heat cycle during brazing by controlling and mapping heat, while taking emissivity coefficient of the material to be brazed into account. Further, a brazing station includes a power generator configured to supply a predetermined voltage to a transformer connected to a circuit forming a shape inductor, the circuit having an overall shape of the parts to be brazed. A pressure mechanism exerts a load on the parts to be brazed. A camera establishes a heat map. A laser-sighted infrared pyrometer measures the brazing temperature by radiation after parameterizing an emissivity coefficient, other parameters being fixed. A controller supplies a set power to the generator on the basis of the measured temperature.

15 Claims, 4 Drawing Sheets

(51) Int. Cl.
*H05B 6/08* (2006.01)
*B23K 35/36* (2006.01)
*B23K 1/002* (2006.01)

(56) References Cited

U.S. PATENT DOCUMENTS

| | | | |
|---|---|---|---|
| 3,296,406 A * | 1/1967 | Stein et al. | 219/667 |
| 3,365,563 A * | 1/1968 | Basinger | 219/607 |
| 3,403,240 A | 9/1968 | Henderson et al. | 219/632 |
| 3,985,989 A * | 10/1976 | Ip et al. | 219/615 |
| 4,919,366 A * | 4/1990 | Cormier | 244/159.1 |
| 5,055,648 A * | 10/1991 | Iceland et al. | 219/601 |
| 5,350,902 A * | 9/1994 | Fox et al. | 219/633 |
| 5,374,808 A * | 12/1994 | Coultrip et al. | 219/633 |
| 6,084,224 A * | 7/2000 | Wiezbowski | 219/667 |
| 6,180,932 B1 * | 1/2001 | Matsen et al. | 219/615 |
| 6,259,071 B1 * | 7/2001 | Demidovitch et al. | 219/486 |
| 6,482,615 B2 * | 11/2002 | Tal et al. | 435/91.2 |
| 6,528,771 B1 * | 3/2003 | Matsen et al. | 219/634 |
| 7,015,439 B1 * | 3/2006 | Thomas et al. | 219/667 |
| 2001/0004983 A1 | 6/2001 | Wiezbowski | |
| 2008/0087359 A1* | 4/2008 | Zurecki et al. | 148/511 |

* cited by examiner

METHOD FOR THE INDUCTION BRAZING OF PARTS HAVING COMPLEX SHAPES, AND SINGLE OR MULTIPLE BRAZING STATION FOR IMPLEMENTING SAME

INTRODUCTION

The present invention relates to an induction brazing method for parts having a complex shape, as well as a brazing station adapted for implementing such a method. Such brazing station may be multiple so as to be able to carry out various brazing steps simultaneously.

The field of the invention is on the induction brazing for part assembly and the invention applies to any part profile to be assembled, in particular for parts of complex shape, having for example curves. The materials must be adapted to be brazed, in particular in relation to the melting points thereof and that of the brazing, with sufficient electrical conductivity and magnetic permeability so that brazing can take effect.

The electromagnetic induction as a heating mode is advantageous: being conventionally performed by a generator coupled with an inductor, it enables a quick heat rise, a quite localized and reproducible heating with a small working cost. Such a heating type applies to numerous cases: annealing (tubes, wires), welding (tubes), surface hardening and annealing (gears), rectification (shafts), etc.

Brazing consists in principle in assembling two metal parts through a metallic joint—the brazing—with a lower melting point than the parts, and needs to do so the implementation of stringent conditions, whatever the heating mode thereof:

an assembly of parts according to a joint plan, plan over plan, with fixed plays between the parts, fats and oxide free part surfaces;

a fixed heat cycle being only subjected to part geometry and part/brazing material couple.

Such a heat cycle conventionally consists in a temperature rise up to the level temperature (slightly higher than the melting temperature of brazing), a temperature holding during a determined period of time, then a cooling of a determined duration. In order to prevent oxidation during heating, two approaches are known depending on the strength of the brazing being desired: in the case of a so-called "strong" brazing, a so-called "flux" flow protects the brazed joint from oxidation during the heat cycle; in the case of a so-called "diffusion" brazing, the atmosphere is generally controlled under a neutral gas, for instance under argon.

Induction as a heating mode for brazing is known for isotope type applications due to the inductor geometry, namely for revolution part assemblies (manifolds, connections, valves, etc.) of assemblies of parts with simple and regular geometry surfaces, and under controlled atmosphere.

Induction brazing generally comprises a solenoid shaped inductor surrounding the parts to be brazed. The inductor is coupled with an optical pyrometer for a temperature regulation depending, on the melting point of the brazing flux.

Such an approach does not enable to enlarge the induction brazing application ranges for part assemblies of a complex shape, in particular complex profile parts, having no revolution or symmetry axis, but an "evolutive" joint plan, that is to say no plan.

DESCRIPTION OF THE INVENTION

The invention precisely aims at performing a brazing of complex profile parts with plays between the parts being able to vary and heat cycles being able to be extremely short, thence by using an induction type heating while enabling to define implementation conditions being reproducible in production.

To reach such objects, the invention aims particularly at adapting the heat cycle during brazing by regulating and checking the temperature homogenization through a heat mapping, while taking the emissivity coefficient of the material to be brazed into account.

Therefore, an object of the present invention is to provide an induction brazing method for parts being able to have a complex shape. Such method consists in defining a heating heat cycle comprising phases of temperature rise, leveling and cooling depending on the parts to be brazed, depositing a brazing seam on a joint plan between the parts to be brazed, exerting a substantially uniform pressure onto the parts to be brazed once united together, making available a heat mapping of the material to be brazed taking the variations of the emissivity coefficient for such material into account during the cycle for a heat homogenization check. Such heat cycle is then regulated by a closed servo loop from a sight in one point being heat representative by also taking variations of the emissivity coefficient of the material in such point into account and by localized heat through a shape induction the closest to the joint plan of the parts to be brazed, on which the brazing seam has been deposited.

In such conditions, the method according to the invention enables to develop the implementation phases for industrial applications thanks to the reproducibility of the heat cycles. The brazing station which was a "bottleneck" station in terms of duration and cost in production becomes a "fluidized" station. Moreover, the non quality rate (in short TNQ) of the brazing is reduced from 30-40% to less than 3%, the remaining costs of NQ becoming negligible. Moreover, the electrical, thermal and magnetic risks are secured.

According to particular embodiments:

taking the emissivity coefficient for the material to be brazed into account with temperature is performed by calibrating the variation of the emissivity coefficient depending on the temperature of such material with respect to a black body from the respective radiating flows obtained at the same temperatures:

the heat induction is localized near the brazing areas to be made, extending according to the joint plan;

the heat representative point is selected near the joint plan;

brazing is defined by fixed parameters in terms of geometry and relative positioning of the parts to be brazed and the shape induction, as well as the surface conditions of the parts to be brazed.

Advantageously, such a method enables to reduce substantially the brazing quantity while improving the quality of the operation. The invention also relates to a brazing station for the implementation of the above mentioned method. Such a station comprises a power generator capable to supply a predetermined voltage to a transformer connected to a circuit forming a shape inductor. Said circuit has an overall shape adapted to be related to the areas being brazed, the part to be brazed is located on a part support of the tooling. Pressure means are adapted to exert a determined and substantially constant constraint on the parts to be brazed. The temperature of the parts upon brazing is measured by a laser-sighted infrared pyrometer and a controller is adapted to supply a power regulation set-point depending on the temperature being measured. Advantageously, the station is portable and thus easily transportable to work on a site, in particular when brazing thus not need the presence of a neutral gas. The pyrometer is provided with a laser-sight so as to be free of any regulation trouble related to heating of close materials.

According to particular embodiments:

the heat mapping is measured by an infrared camera upon the adjustment of the brazing parameters, before launching the serial manufacture, to fix such parameters;

the inductor consists in a metallic structure with a rectangular section, preferably a square one with a side lower than 1 cm, formed with linear lengths connected by welding, taking globally the shape of the joint plan of the parts to be brazed;

field concentrators are located at the level of the angular connections of the inductor so as to eliminate the leakage areas;

the inductor is positioned at a distance of the cover to be brazed which does not exceed 2 mm;

the pressure means are made of a clamping tip provided with insulating fingers equipped with springs exerting a pressure against one side of the parts to be brazed so as to apply a determined and substantially constant constraint over the whole two parts;

compressed air nozzles are advantageously located close to the parts to be brazed so as to accelerate cooling in order to reduce the cycle period as soon as the value of the temperature has released the assembly about any quenching risk of the materials.

A multiple brazing station advantageously comprised several inductors as defined previously so as to braze simultaneously several joints of a same part. Advantageously, a generator, a transformer and a regulator can be used in common.

The invention relates in particular to brazing of covers of turbine blades also called nozzle guide vanes.

BRIEF DESCRIPTION OF THE FIGURES

Other characteristics and advantages of the invention will come from the reading of the following description related to an exemplary embodiment referring to the accompanying figures, wherein.

DETAILED DESCRIPTION OF AN EXEMPLARY EMBODIMENT

Figure 1:
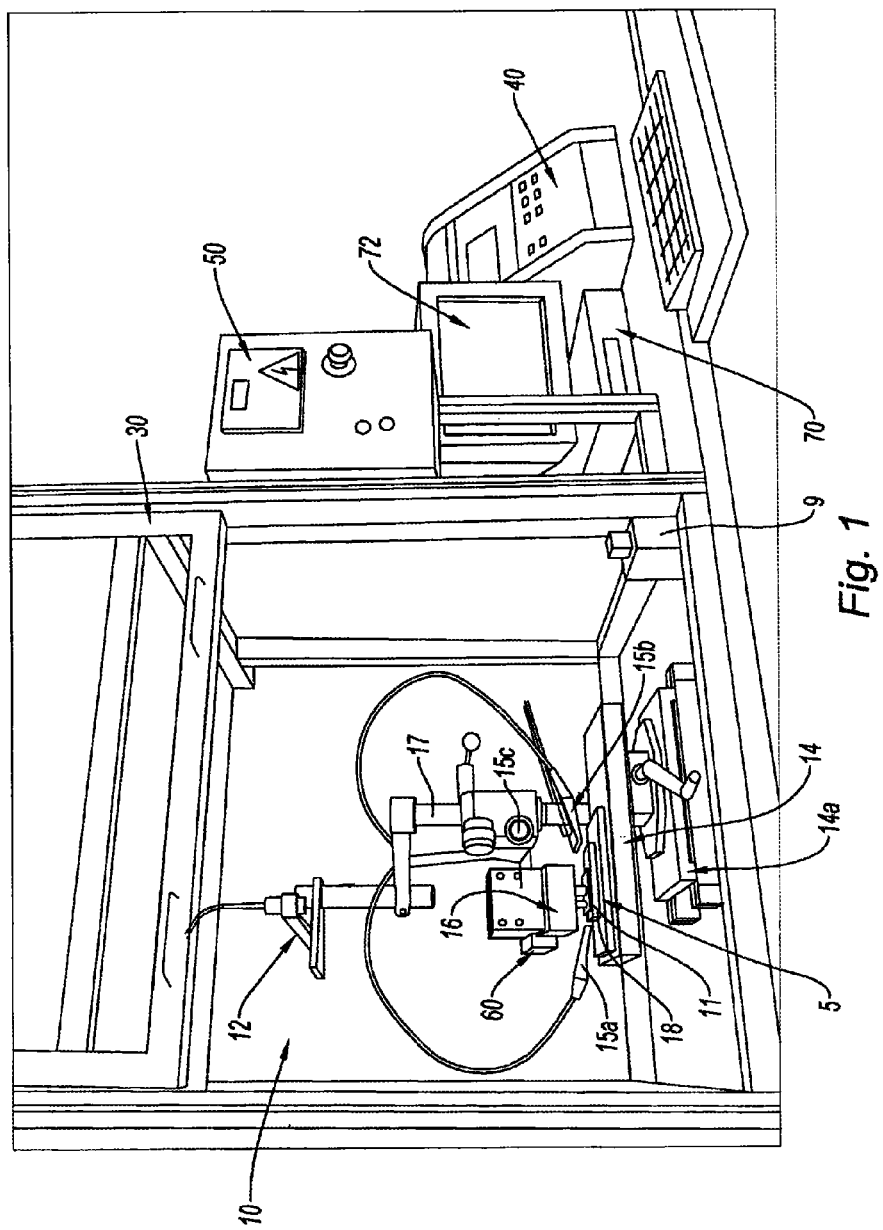
FIG. 1 is a schematic view of an exemplary installation of a brazing station according to the invention.

Referring to FIG. 1, an installation according to the invention comprises a heating equipment set arranged in an enclosure 10 under free atmosphere, provided with an access door 30 which can be blocked by a lock 9 for safety reasons and an electrical power equipment outside the enclosure: a high frequency power generator 40 to favour the surface currents, being coupled with a power controller 50 upstream and a transformer 60 downstream, this last one being able to be integrated into the enclosure 10—as a transformer head—in the vicinity of the heating equipment as in the illustrated example. The controller 50 controls the regulation and follows the evolution of the parts being brazed. A data processing unit 70, provided with a visualization terminal 72, enables to register heat cycle data and emissivity coefficients of the main brazing material depending on the temperature.

The heating equipment set consists in an inductor 11 mounted across the transformer 60 and a bichromatic laser-sighted infrared pyrometer 12 coupled with the controller 50. Such heat cycle is then regulated by a closed servo loop from a sight in one point being heat representative by also taking variations of the emissivity coefficient of the material in such point into account and by localized heat through a shape induction the closest to the joint plan of the parts to be brazed, on which the brazing seam has been deposited. The inductor 11 is located in front of a table 14—provided with a two-axis movement frame 14a. The parts to be brazed are deposited in a support 5 made of a refractory insulating material put on the table 14. Compressed air nozzles 15a and 15b are advantageously arranged between the inductor 11 and the table 14. Such nozzles are connected to a compressor 15c piloted by the controller 50. The pressure equipment comprises a tip 16 being vertically mounted on a spring (see FIG. 4) and goes through the inductor 11 while overhanging the support 5. Such tip is provided with six contact fingers 18 in a thermally insulating material, mounted on springs of an adjustable height so as to allow the whole fingers to exert a substantially uniform constraint on the part to be brazed.

The example hereinafter relates to the brazing of a cover for a nozzle guide vane of a gas turbine. A turbine nozzle consists in blades forming a fixed set of blades and two rings, the blades being provided with feet mounted on the internal ring. The function of the turbine nozzle is to deviate the air flow received on the leading edge between the sides of the blades so as to orient the air flow of the mobile set of blades in rotation.

Figure 2:
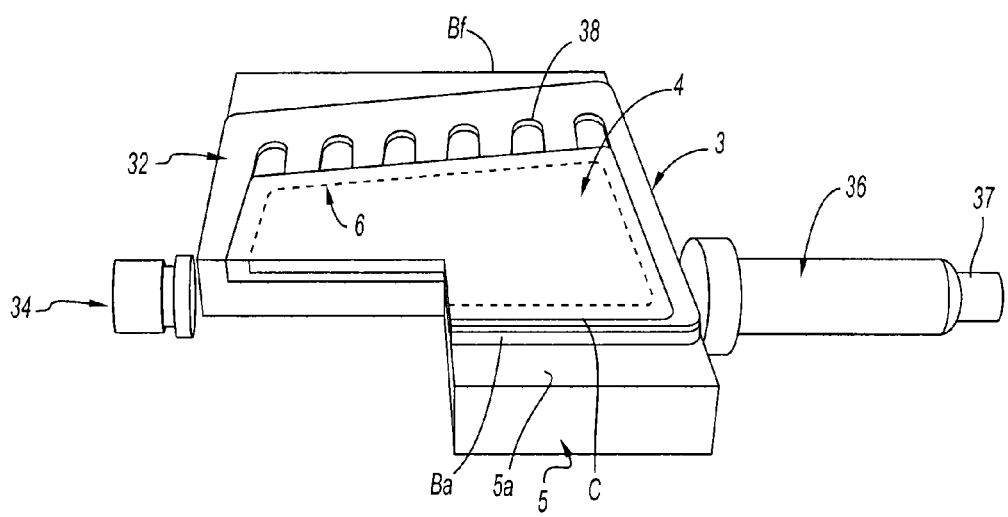
FIG. 2 is a perspective view, including a cut away view, of a nozzle guide vane and the cover to be brazed, being positioned on an appropriate support.

The perspective view of FIG. 2 illustrates the positioning of the parts—one blade 3 and the cover 4 thereof—in a support 5 made of a refractory material before starting brazing. The blade and the cover are globally in a top view with a trapezoid form. The blade 3 presents two main sides, a concave intrados side 32 and a convex extrados side (not visible on the figure) with a leading edge Ba and a trailing edge Bf which demarcate those sides. The cover 4 is formed as a flat wall.

On the bases of the trapezium, the blade is respectively equipped with a head 34 and a foot 36 in which a plug 37 is stuck. The intrados side 32 of the blade 3 comprises a set of open channels 38, or vents, arranged in parallel to lead in the vicinity of the trailing edge Bf of the blade 3.

The support 5 presents an upper side 5a which suits to the extrados side of the blade so that the blade is well blocked. The intrados side 32 of the blade receives a brazing seam 6 (in dotted line) under the initial form of a strip deposited on the joint plan in the immediate inside of the contour of the cover 4 of the joint plan for this side 32. The cover 4 is also put on the joint plan of the side 32 via the brazing seam. In the example, the brazing is a 50% silver based alloy, and the parts to be brazed are made in a copper-cobalt-beryllium alloy.

Figure 3:
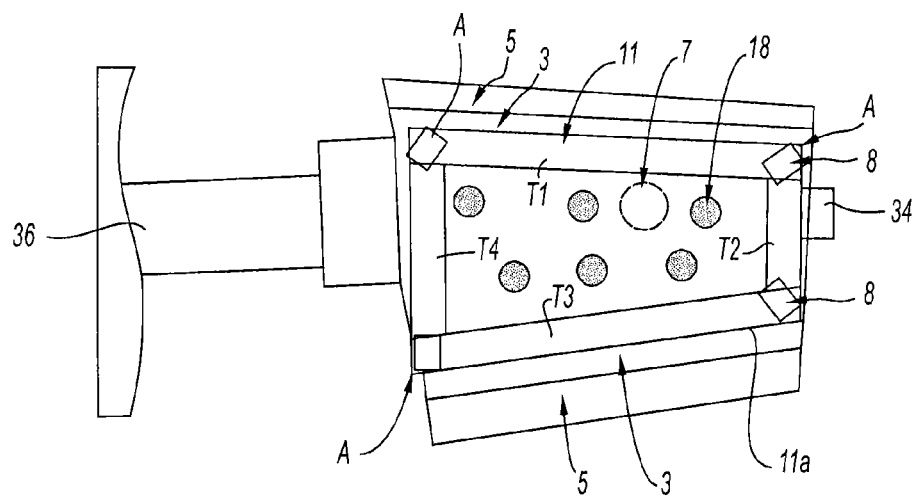
FIG. 3 is a bottom view of the parts to be brazed according to FIG. 2 with a shape inductor according to the invention.
Figure 4:
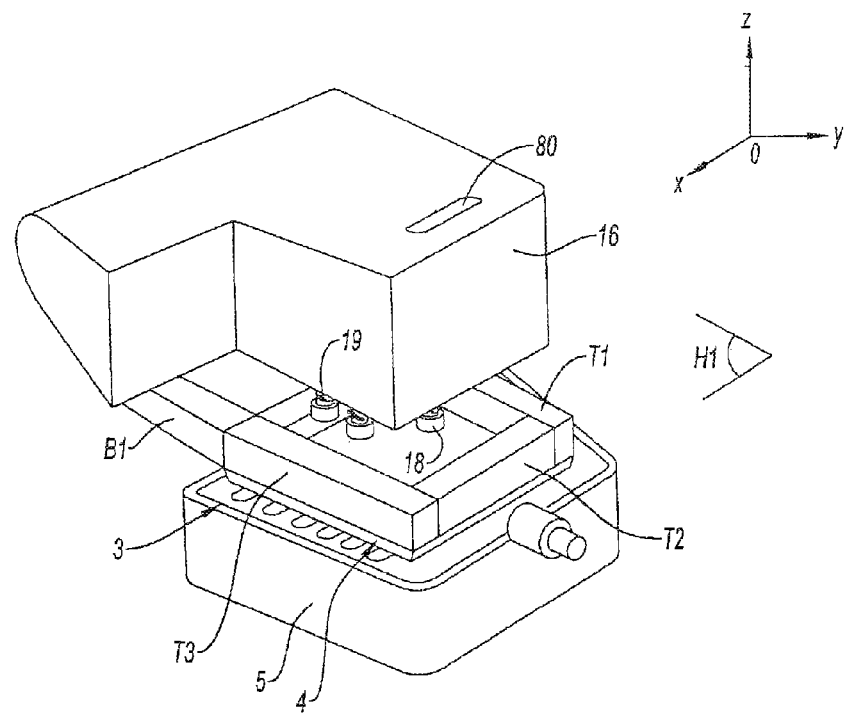
FIG. 4 is a schematic view in perspective of the holding and clamping tooling during brazing.

The inductor 11 is present under the shape of a conformation circuit being globally adapted to the conformation of the joint plan of a cover and a blade, as illustrated by the top view of FIG. 3 and the perspective view of FIG. 4. Such circuit 11 consists in lengths 11a of copper tubes of a square section and with a side smaller than, but close to 1 cm. The lengths are linear and connected by welding so as to globally suit to the contour of the part 3 to be brazed arranged on the support 5. FIG. 3 also shows the mark of the contact fingers 18 and the pyrometric sight representative point 7 in the vicinity of the joint plan.

The inductor 11 thus possesses a global adapted conformation enabling to come closer at most, with no contact, to the longitudinal brazing areas. Consequently, the inductor consists here in four main lengths, T1 to T4, globally in a same horizontal plan H1 parallel to XOY. Generally speaking, such conformation and geometry of the inductor enable to come closer to the parts to be brazed with an air gap smaller than 2 mm, while the prior art requires to keep a distance of about 2 cm. The air gap can vary depending on different parameters: composition and quantity of brazing, heat cycle, part geometry, and intensity of the current being induced, etc.

The lengths T1 to T4 form in a top view a "U" and are connected on the end to the transformer (not shown). The intensity of the current and the alternating voltage delivered by the transformer are adapted for the dimension and the nature of the parts to be brazed and of the brazing so as to create a magnetic field and thus an induced current with appropriate intensities for the materials. Ferrite field concentrators 8 are advantageously arranged in the lengths and more precisely at the level of the connections A of such length to limit the trailing areas and concentrate the induced current in the brazing areas.

As illustrated by FIG. 4, springs 19 hold in extension the contact fingers 18 guided by the tip 16. Furthermore, the tip 16 is crossed by a lumen 80 enabling the passage of the laser ray of the infrared pyrometer (not shown).

Figure 5:
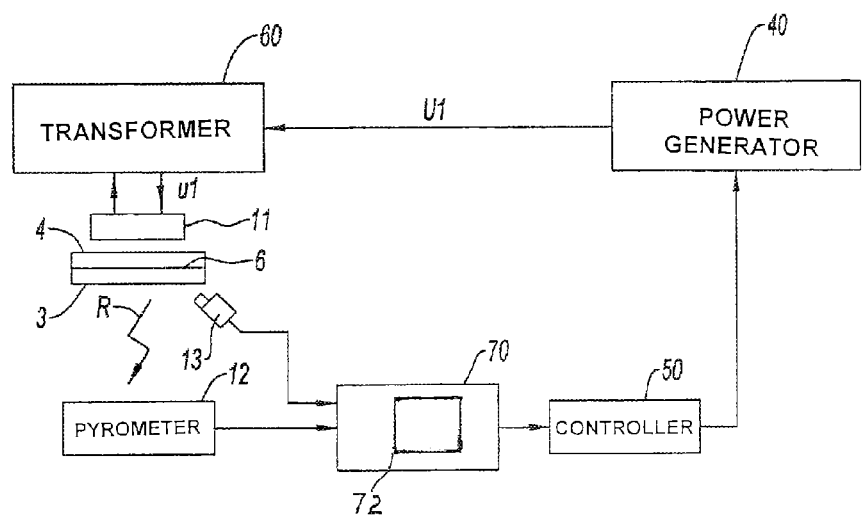
FIG. 5 is a block diagram for implementing the brazing method of the invention.

The above mentioned tooling can be implemented according to the block diagram illustrated in FIG. 5 which lists the main equipment disclosed referring to FIG. 1: the power generator 40, the transformer 60 and the inductor 11 coupled together; the pyrometer 12 for measuring the radiation R, the controller 50 connected to the generator 40, and the data processing unit 70 for registering being coupled to the visualization terminal 72 in real time of the heat cycles.

The brazing parameters—dimension and geometry of the inductor 11, surface conditions of the parts 3 and 4 (cleaning, pickling, etc.), deposit of a brazing 6 on the joint plan as strips, deposit of the cover on the blade, air gap between the equipment and the parts to be brazed, constraint exerted by the pressure tip on the parts—are fixed before the implementation of the heat cycle. In the example, the air gap is substantially equal to 1 mm and pressure is fixed at 0.02 N per finger, i.e. 0.12 N for the whole fingers.

The generator 60 with a power here equal to 6 kW, supplies a voltage U1 which is converted into an alternating voltage by the transformer 60. This transformer applies the tension U1 across the inductor 11. The induced current releases then by a Joule effect sufficient temperature in the brazing seam 6 between the parts 3 and 4 to be brazed so as to liquefy the brazing between such parts and cause brazing.

The homogeneity of the temperature in the brazed joint being formed is advantageously followed by the infrared camera 13 which transmits an image of the area of the parts to be brazed to the processing unit 70. The heat homogeneity monitoring can be advantageously performed by comparison between the image transmitted by the camera upon heating and a previously established heat mapping. Mappings can be established and pre-registered for different heat cycles and different materials to be brazed also pre-registered in the processing unit.

The check of the heat control is carried out from temperature measurements performed by the pyrometer 12 and transmitted to the controller 50. A heat representative point located in the joint plan in the vicinity of the joint is selected as a sight point of the pyrometer 7 (FIG. 3) thanks to the mapping previously established by the IR camera.

The temperature values measured by the pyrometer and the infrared camera are corrected during the adjustment phase with the simulation with a black body so as to be free of the variation of the emissivity coefficient of the radiation with temperature. To do so, the assembly is covered with a paint having an emissivity coefficient close to "1" so as to simulate a black body. The adjustments of a reproducible heating are then defined. Then, with as starting value the abacuses of the emissivity coefficients of the main alloys, the exact coefficient is adjusted so as to reproduce the previously obtained cycle.

The heat cycle to be applied is parameterized in the controller 50: durations of the temperature rise, of the leveling and of the cooling, temperatures at the boundaries of these periods. Advantageously, the cycle can be selected amongst previously registered cycles. At each temperature measurement by the pyrometer, the deviation between the measured value—corrected by the emissivity factor—and the value expected at the cycle instant is estimated by the controller 50. A set-point of the power regulation which is able to reduce such deviation to zero is developed by the controller 50 and transmitted to the generator 40 which adjusts its power according to the set-point signal being so transmitted.

In the example, the total duration of the cycle does not exceed 5 min, with a temperature rise of 1 min, a level of 1 min and a cooling of 3 min. The level temperature is stabilized in the range of 680 to 720° C. with the silver based brazing. Cooling is free up to about 300° C., because a forced cooling could lead to a "quenching" of the material.

The invention is not limited to the examples being described and represented. It is for example possible to implement a brazing automation by using a direct numerical control adapted to be manually broken or by an automat at any moment, from the data processing unit. After entering all the fixed parameters which will stay fixed during the operation and the acquisition of data relative to the materials of the brazing being used and the parts to be brazed, the regulation loop of the selected heat cycle is launched by the control and checked by the processing unit. The mapping follow-up enables to verify the robustness of the method. The conformity with the previously registered model is verified and a visual or sound alert can be released in the case where there is a temperature deviation exceeding a predetermined threshold.

Moreover, numerous brazing operations can be piloted by the method and the tooling according to the invention, in particular the brazings which do not need a controlled atmosphere. Furthermore, brazing parts can be done in a range of important temperatures, for example between 500 and 800° C.

The invention claimed is:

1. An induction brazing method for parts able to have a complex shape, comprising:
   defining a heating heat cycle comprising phases of temperature rise, leveling and cooling depending on a material to be brazed;
   depositing a brazing seam on a joint plan between the parts to be brazed;
   exerting a substantially uniform pressure onto the parts to be brazed;
   making available a heat mapping of the material to be brazed taking variations of emissivity coefficient for such material into account during a cycle for a heating homogenization check; and
   then regulating such heat cycle by a closed servo loop from a sight in one point being heat representative by further taking variations of the emissivity coefficient of the material in such point into account and by a localized heat through a shape induction closest to the joint plan of the parts to be brazed, on which the brazing seam has been deposited, wherein an inductor presents globally a shape of the joint plan of the parts to be brazed.

2. The induction brazing method according to claim 1, wherein taking the emissivity coefficient for the material to be brazed into account with temperature is performed by calibrating a variation of the emissivity coefficient depending on the temperature of such material with respect to a black body from respective radiating flows obtained at a same temperature.

3. The induction brazing method according to claim 1, wherein the heat induction is localized near the brazing areas extending according to longitudinal portions of the joint plan.

4. The induction brazing method according to claim 1, wherein the heat representative point is selected near the joint plan.

5. The induction brazing method according to claim 1, wherein brazing is defined by fixed parameters in terms of geometry and relative positioning of the parts to be brazed and a shape inductor, and a surface condition of the parts to be brazed.

6. A brazing station for implementation of the method according to claim 1, comprising:
   a power generator configured to supply a predetermined voltage to a transformer connected to a circuit forming a shape inductor, the circuit having an overall shape configured to be related to longitudinal areas being brazed defined by a contour of the part to be brazed located on a support;
   pressure means to exert a determined and substantially constant constraint on the parts to be brazed;
   a laser-sighted infrared pyrometer measuring the brazing temperature; and
   a controller configured to supply a power regulation setpoint to the generator depending on the temperature being measured.

7. The brazing station according to claim 6, wherein the heat mapping is measured by an infrared camera upon an adjustment phase of the brazing parameters, before launching serial manufacture, to fix such brazing parameters.

8. The brazing station according to claim 6, wherein the inductor includes a metallic structure with a rectangular section, or a square structure formed with linear lengths connected by welding.

9. The brazing station according to claim 8, wherein the metallic structure of the inductor has a square section with a side smaller than 1 cm.

10. The brazing station according to claim 8, wherein field concentrators are located at a level of the angular connections of the inductor.

11. The brazing station according to claim 6, wherein the pressure means includes a clamping tip including insulating fingers including springs exerting a pressure against one side of one of the parts to be brazed so as to apply a determined and substantially constant constraint over a whole of the two parts.

12. The brazing station according to claim 6, wherein compressed air nozzles are located close to the parts to be brazed so as to accelerate cooling.

13. The brazing station according to claim 6 comprising plural inductors, and configured to simultaneously braze various joints of one single part.

14. The brazing station according to claim 13, wherein the generator, the transformer, and the controller are used in common for all tools the plural inductors.

15. The induction brazing method according to claim 1, wherein the inductor is free of contact with longitudinal brazing areas.

* * * * *